(12) United States Patent
Coassin et al.

(10) Patent No.: US 6,229,603 B1
(45) Date of Patent: *May 8, 2001

(54) LOW BACKGROUND MULTI-WELL PLATES WITH GREATER THAN 864 WELLS FOR SPECTROSCOPIC MEASUREMENTS

(75) Inventors: Peter J. Coassin, Encinitas; Alec Tate Harootunian, San Diego; Roger Y. Tsien, La Jolla; Andrew A. Pham, Del Mar, all of CA (US)

(73) Assignee: Aurora Biosciences Corporation, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 08/867,584

(22) Filed: Jun. 2, 1997

(51) Int. Cl.⁷ ...................................................... G01N 1/10
(52) U.S. Cl. ............................................ 356/246; 356/440
(58) Field of Search ................................... 356/246, 440; 422/102, 99

(56) References Cited

U.S. PATENT DOCUMENTS

| | | |
|---|---|---|
| D. 265,124 | 6/1982 | Terk . |
| D. 266,589 | 10/1982 | Gilford et al. . |
| D. 269,702 | 7/1983 | Suovaniemi et al. . |
| D. 288,604 | 3/1987 | Winston et al. . |
| D. 317,360 | 6/1991 | Gabridge . |
| 4,004,150 | 1/1977 | Natelson . |
| 4,154,795 | 5/1979 | Thorne . |
| 4,251,159 | 2/1981 | White . |
| 4,276,259 | 6/1981 | Eibl et al. . |
| 4,431,307 | 2/1984 | Suovaniemi . |
| 4,468,974 | 9/1984 | Malinoff . |
| 4,545,958 | 10/1985 | Dopatka . |
| 4,652,553 | 3/1987 | Hagmann et al. . |
| 4,657,867 | 4/1987 | Guhl et al. . |
| 4,689,380 | 8/1987 | Nahm . |

(List continued on next page.)

FOREIGN PATENT DOCUMENTS

| | | |
|---|---|---|
| WO 86/07606 | 12/1986 | (WO) . |
| WO 92/01513 | 2/1992 | (WO) . |
| WO 92/01553 | 2/1992 | (WO) . |
| WO 94/23839 | 10/1994 | (WO) . |
| WO 95/22406 | 8/1995 | (WO) . |
| WO 96/39481 | 12/1996 | (WO) . |

OTHER PUBLICATIONS

Corning Costar 1996/1997 Catalogue (1996) (pp. 1–3, 11–12, 29–42, 52, 56–83, 108–112).
Corning Costar, "Assay Products for High Throughput Screening" (1996) (pp. 1–31).
Millipore 1997 Labortary Catalogue, (1997) (pp. 34–37).
Nunc, "FluoroNunc™ Samples" (1993) (pp. 1–9, 22–26, 28–38, 44).
Tom Astle, "Standards in Robotics and Instumentation" 1996, Journal ofBiomolecular Screening vol. 1, No. 4, 1996 pp. 163–168.
Hoechst® Technical Information, "Topas, Cycloolefin Copolymers," 1996.

*Primary Examiner*—Frank G. Font
*Assistant Examiner*—Reginald A. Ratiff
(74) *Attorney, Agent, or Firm*—Gray Cary Ware & Freidenrich LLP; Lisa A. Haile (57) ABSTRACT

The invention provides for multi-well plates with greater than 864 wells that comprise a layer of cycloolefin having low fluorescence and high transmittance. These multi-well plates are particularly well suited for fluorescent measurements.

32 Claims, 1 Drawing Sheet

U.S. PATENT DOCUMENTS

| | | |
|---|---|---|
| 4,707,454 | 11/1987 | Hendrix . |
| 4,735,778 | 4/1988 | Maruyama et al. . |
| 4,741,619 | 5/1988 | Humphries et al. . |
| 4,770,856 | 9/1988 | Uthemann et al. . |
| 4,797,259 | 1/1989 | Matkovich et al. . |
| 4,828,386 | 5/1989 | Matkovich et al. . |
| 4,874,808 | 10/1989 | Minami et al. . |
| 4,892,409 | 1/1990 | Smith . |
| 4,899,005 | 2/1990 | Lane et al. . |
| 4,918,133 | 4/1990 | Moriya et al. . |
| 4,935,475 | 6/1990 | Kishimura et al. . |
| 4,948,442 | 8/1990 | Manns . |
| 4,948,856 | 8/1990 | Minchak et al. . |
| 4,956,150 | 9/1990 | Henry . |
| 4,968,625 | 11/1990 | Smith et al. . |
| 4,994,354 | 2/1991 | Toibana et al. . |
| 5,041,266 | 8/1991 | Fox . |
| 5,047,215 | 9/1991 | Manns . |
| 5,084,246 | 1/1992 | Lyman et al. . |
| 5,110,556 | 5/1992 | Lyman et al. . |
| 5,115,052 | 5/1992 | Wamura et al. . |
| 5,147,780 | 9/1992 | Pouletty et al. . |
| 5,149,654 | 9/1992 | Gross et al. . |
| 5,206,306 | 4/1993 | Shen . |
| 5,241,012 | 8/1993 | Clark . |
| 5,270,393 | 12/1993 | Sagane et al. . |
| 5,272,235 | 12/1993 | Wakatsuru et al. . |
| 5,278,214 | 1/1994 | Moriya et al. . |
| 5,278,238 | 1/1994 | Lee et al. . |
| 5,294,795 | 3/1994 | Lehtinen et al. . |
| 5,319,436 | 6/1994 | Manns et al. . |
| 5,395,869 | 3/1995 | Kawamoto et al. . |
| 5,428,098 | 6/1995 | Brekner et al. . |
| 5,456,360 | 10/1995 | Griffin . |
| 5,487,872 | 1/1996 | Hafeman et al. . |
| 5,496,502 | 3/1996 | Thomson . |
| 5,516,490 | 5/1996 | Sanadi . |
| 5,532,030 | 7/1996 | Hirose et al. . |
| 5,534,606 | 7/1996 | Bennett et al. . |
| 5,540,891 | 7/1996 | Portmann et al. . |
| 5,545,528 | 8/1996 | Mitsuhashi et al. . |
| 5,583,211 | 12/1996 | Coassin et al. . |
| 5,604,130 | 2/1997 | Warner et al. . |
| 5,609,826 | 3/1997 | Cargill et al. . |
| 5,858,309 | 1/1999 | Mathus et al. . |

LOW BACKGROUND MULTI-WELL PLATES WITH GREATER THAN 864 WELLS FOR SPECTROSCOPIC MEASUREMENTS

TECHNICAL FIELD

The present invention generally relates to multi-well plates made with cycloolefins for use in spectroscopic measurements and methods of making such devices. Multi-well plates are particularly useful for fluorescence measurements of chemical or biological samples.

INTRODUCTION

A number of multi-well plates are commercially available for culturing cells or performing chemical or cellular assays. While many of these multi-well plates offer the desirable features of biocompatibility, ease of manufacture and substantial structural integrity, the inventors of the present invention have generally found that these plates, especially plates with polymeric bottoms, suffer from a substantially high degree of fluorescence. The relatively high amount of background fluorescence inherent in commercially available plates with polymeric bottoms makes such plates generally not suitable for highly sensitive fluorescence measurements associated with many assays, particularly assays of microliter volumes or less.

The inventors of the present invention recognized a need in the chemical and biological arts for multi-well plates for chemical or biological events, such as binding assays or cell-based assays. The inventors prepared selection criteria for suitable materials for manufacturing multi-well plates for such applications. As a key example of the selection criteria, which is more fully described herein, the inventors investigated the spectral properties of various polymers, including their fluorescence and transmittance, for compatibility with spectroscopic measurements of chemical and biological events. Such materials would also desirably, but not necessarily depending on the application, have biocompatibility, relative chemical inertness, sufficient rigidity for the application at hand and ease of manufacture. The inventors selected a variety of polymers for testing based, in part, on the structural features of the polymers, which is more fully described herein. The inventors' search for polymers included searching fields not associated with spectroscopic measurements, including arts associated with cycloolefin polymers, such as the electronics and audio recording arts. The inventors compared a variety of materials to silica sheets (e.g. glass) that have relatively minor inherent fluorescence. Out of a number of films tested, the inventors surprisingly found cycloolefin films to possess the fluorescence and transmittance properties that approach (or even out perform) that of fused silica glass.

As described herein the inventors for the first time have developed novel multi-well plates using cycloolefins that offer excellent performance characteristics in assays. Such multi-well plates can be used in conventional 96-well plates or higher density formats, such as 364 wells per plate. Such plates may also be used for other applications such as diagnostics or synthesis of chemicals.

SUMMARY

The present invention provides multi-well plates having a footprint of a standard microtiter plate and greater than 864 wells for spectroscopic measurements. Multi-well plates of the invention comprise a layer of low fluorescence and high transmittance, comprising a cycloolefin polymer, and a well to hold, or form, the layer. The cycloolefin usually comprises at least a portion of a bottom surface of a well of the multiwell plate.

The invention also includes methods for detection and manufacturing that relate to multi-well plates of the invention.

BRIEF DESCRIPTION OF THE DRAWINGS

The accompanying drawings, which are incorporated in and form part of the specification, merely illustrate embodiments of the present invention. Together with the remainder of the specification, they are meant to serve to explain certain principles of the invention to those of skill in the art.

In FIG. 1A, a well 10 is shown within a frame 20, of one embodiment of the invention.

DETAILED DESCRIPTION OF THE INVENTION

Definitions

Figure 1A:
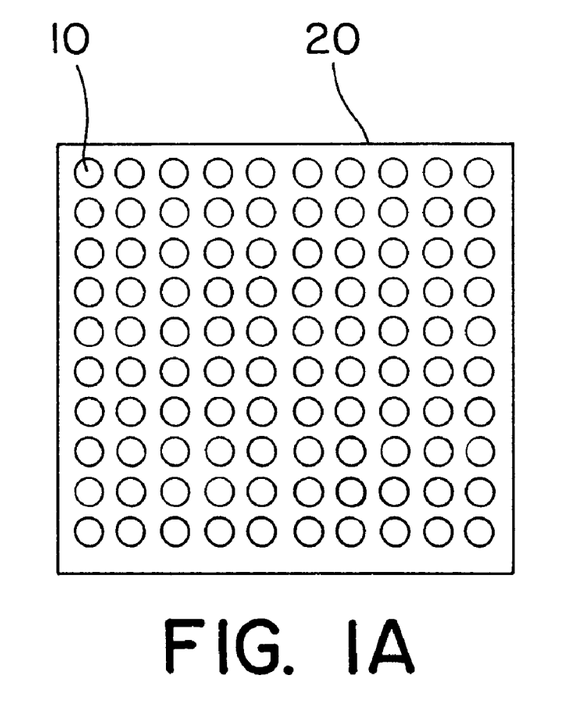
FIG. 1A shows a planar view of one embodiment of a multi-well plate.
Figure 1B:
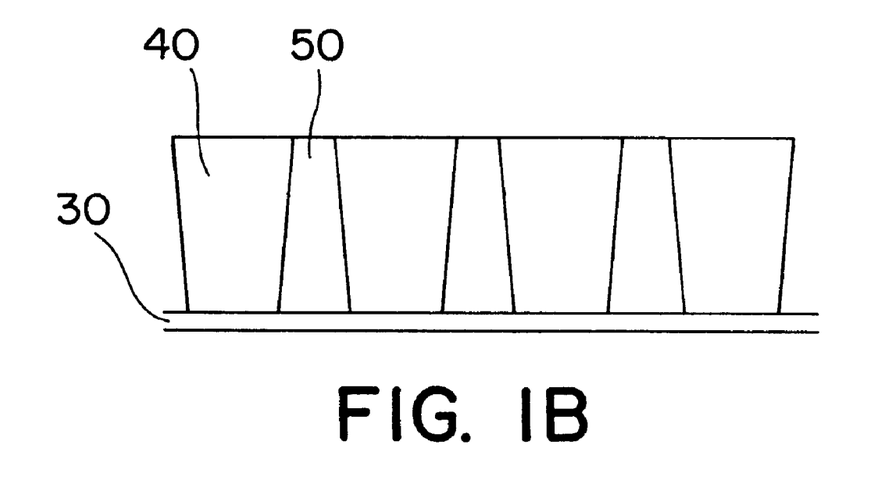
FIG. 1B shows a cross-sectional view of one embodiment of the invention showing a low fluorescence high transmittance layer 30, an assay site 40 and well walls 500.

Unless defined otherwise, all technical and scientific terms used herein have the same meaning as commonly understood by one of ordinary skill in the art to which this invention belongs. Generally, the nomenclature used herein and the laboratory procedures in spectroscopy, drug discovery, cell culture, molecular genetics, plastic manufacture, polymer chemistry, diagnostics, and amino acid and nucleic acid chemistry described below are those well known and commonly employed in the art. Standard techniques are typically used for preparation of plastics, signal detection, recombinant nucleic acid methods, polynucleotide synthesis, and microbial culture and transformation (e.g., electroporation, lipofection). The techniques and procedures are generally performed according to conventional methods in the art and various general references (see generally, Sambrook et al. Molecular Cloning: A Laboratory Manual, 2d ed. (1989) Cold Spring Harbor Laboratory Press, Cold Spring Harbor, N.Y., and Lakowicz, J. R. *Principles of Fluorescence Spectroscopy,* New York: Plenum Press (1983) for fluorescence techniques, which are incorporated herein by reference) which are provided throughout this document. Standard techniques are used for chemical syntheses, chemical analyses, and biological assays. As employed throughout the disclosure, the following terms, unless otherwise indicated, shall be understood to have the following meanings:

"Fluorescent donor moiety" refers to the radical of a fluorogenic compound which can absorb energy and is capable of transferring the energy to another fluorogenic molecule or part of a compound. Suitable donor fluorogenic molecules include, but are not limited to, coumarins and related dyes xanthene dyes such as fluoresceins, rhodols, and rhodamines, resorufins, cyanine dyes, bimanes, acridines, isoindoles, dansyl dyes, aminophthalic hydrazides such as luminol and isoluminol derivatives, aminophthalimides, aminonaphthalimides, aminobenzofurans, aminoquinolines, dicyanohydroquinones, and europium and terbium complexes and related compounds.

"Quencher" refers to a chromophoric molecule or part of a compound which is capable of reducing the emission from a fluorescent donor when attached to the donor. Quenching may occur by any of several mechanisms including fluorescence resonance energy transfer, photoinduced electron transfer, paramagnetic enhancement of intersystem crossing, Dexter exchange coupling, and excitation coupling such as the formation of dark complexes.

"Acceptor" refers to a quencher that operates via fluorescence resonance energy transfer. Many acceptors can re-emit the transferred as energy as fluorescence. Examples include coumarins and related fluorophores, xanthenes such as fluoresceins, rhodols, and rhodamines, resorufins, cyanines, difluoroboradiazaindacenes, and phthalocyanines. Other chemical classes of acceptors generally do not re-emit the transferred energy. Examples include indigos, benzoquinones, anthraquinones, azo compounds, nitro compounds, indoanilines, di- and triphenylmethanes.

"Binding pair" refers to two moieties (e.g. chemical or biochemical) that have an affinity for one another. Examples of binding pairs include antigen/antibodies, lectin/avidin, target polynucleotide/probe oligonucleotide, antibody/anti-antibody, receptor/ligand, enzyme/ligand and the like. "One member of a binding pair" refers to one moiety of the pair, such as an antigen or ligand.

"Dye" refers to a molecule or part of a compound that absorbs specific frequencies of light, including but not limited to ultraviolet light. The terms "dye" and "chromophore" are synonymous.

"Fluorophore" refers to a chromophore that fluoresces.

"Membrane-permeant derivative" refers a chemical derivative of a compound that has enhanced membrane permeability compared to an underivativized compound. Examples include ester, ether and carbamate derivatives. These derivatives are made better able to cross cell membranes, i.e. membrane permeant, because hydrophilic groups are masked to provide more hydrophobic derivatives. Also, masking groups are designed to be cleaved from a precursor (e.g., fluorogenic substrate precursor) within the cell to generate the derived substrate intracellularly. Because the substrate is more hydrophilic than the membrane permeant derivative it is now trapped within the cells.

"Alkyl" refers to straight, branched, and cyclic aliphatic groups generally of 1 to 8 carbon atoms, preferably 1 to 6 carbon atoms, and most preferably 1 to 4 carbon atoms. The term "lower alkyl" refers to straight and branched chain alkyl groups of 1 to 4 carbon atoms.

"Aliphatic" refers to saturated and unsaturated alkyl groups generally of 1 to 10 carbon atoms, preferably 1 to 6 carbon atoms, and most preferably 1 to 4 carbon atoms.

"Heat fusion weld" refers to a weld induced by heat. The source of heat can be any source sufficient to promote some degree of attachment between two portions (separate or otherwise) of a material(s), including a chemical reaction, an external heat source (e.g., a heated platen, ultrasonic or air) or internal heating (e.g., radio frequency heating).

"Isolated polynucleotide" refers a polynucleotide of genomic, cDNA, or synthetic origin or some combination there of, which by virtue of its origin the "isolated polynucleotide" (1) is not associated with the cell in which the "isolated polynucleotide" is found in nature, or (2) is operably linked to a polynucleotide which it is not linked to in nature.

"Isolated protein" refers a protein of cDNA, recombinant RNA, or synthetic origin or some combination thereof, which by virtue of its origin the "isolated protein" (1) is not associated with proteins found it is normally found with in nature, or (2) is isolated from the cell in which it normally occurs or (3) is isolated free of other proteins from the same cellular source, e.g. free of human proteins, or (4) is expressed by a cell from a different species, or (5) does not occur in nature. "Isolated naturally occurring protein" refers to a protein which by virtue of its origin the "isolated naturally occurring protein" (1) is not associated with proteins that it is normally found with in nature, or (2) is isolated from the cell in which it normally occurs or (3) is isolated free of other proteins from the same cellular source, e.g. free of human proteins.

"Polypeptide" as used herein as a generic term to refer to native protein, fragments, or analogs of a polypeptide sequence. Hence, native protein, fragments, and analogs are species of the polypeptide genus.

"Naturally-occurring" as used herein, as applied to an object, refers to the fact that an object can be found in nature. For example, a polypeptide or polynucleotide sequence that is present in an organism (including viruses) that can be isolated from a source in nature and which has not been intentionally modified by man in the laboratory is naturally-occurring.

"Operably linked" refers to a juxtaposition wherein the components so described are in a relationship permitting them to function in their intended manner. A control sequence "operably linked" to a coding sequence is ligated in such a way that expression of the coding sequence is achieved under conditions compatible with the control sequences.

"Control sequence" refers to polynucleotide sequences which are necessary to effect the expression of coding and non-coding sequences to which they are ligated. The nature of such control sequences differs depending upon the host organism; in prokaryotes, such control sequences generally include promoter, ribosomal binding site, and transcription termination sequence; in eukaryotes, generally, such control sequences include promoters and transcription termination sequence. The term "control sequences" is intended to include, at a minimum, components whose presence can influence expression, and can also include additional components whose presence is advantageous, for example, leader sequences and fusion partner sequences.

"Polynucleotide" refers to a polymeric form of nucleotides of at least 10 bases in length, either ribonucleotides or deoxynucleotides or a modified form of either type of nucleotide. The term includes single and double stranded forms of DNA.

"Corresponds to" refers to a polynucleotide sequence is homologous (i.e., is identical, not strictly evolutionarily related) to all or a portion of a reference polynucleotide sequence, or that a polypeptide sequence is identical to a reference polypeptide sequence. In contradistinction, the term "complementary to" is used herein to mean that the complementary sequence is homologous to all or a portion of a reference polynucleotide sequence. For illustration, the nucleotide sequence "TATAC" corresponds to a reference sequence "TATAC" and is complementary to a reference sequence "GTATA".

"Polypeptide fragment" refers to a polypeptide that has an amino-terminal and/or carboxy-terminal deletion, but where the remaining amino acid sequence is usually identical to the corresponding positions in the naturally-occurring sequence deduced, for example, from a fill-length cDNA sequence. Fragments typically are at least 5, 6, 8 or 10 amino acids long, preferably at least 14 amino acids long, more preferably at least 20 amino acids long, usually at least 50 amino acids long, and even more preferably at least 70 amino acids long.

"Plate" refers to a multi-well plate, unless otherwise modified in the context of its usage.

"Modulation" refers to the capacity to either enhance or inhibit a functional property of biological activity or process (e.g., enzyme activity or receptor binding); such enhancement or inhibition may be contingent on the occurrence of a specific event, such as activation of a signal transduction pathway, and/or may be manifest only in particular cell types.

The term "modulator" refers to a chemical compound (naturally occuring or nonnaturally occurring), such as a biological macromolecule (e.g., nucleic acid, protein, nonpeptide, or organic molecule), or an extract made from biological materials such as bacteria, plants, fungi, or animal (particularly mammalian) cells or tissues. Modulators are evaluated for potential activity as inhibitors or activators (directly or indirectly) of a biological process or processes (e.g., agonist, partial antagonist, partial agonist, antagonist, antineoplastic agents, cytotoxic agents, inhibitors of neoplastic transformation or cell proliferation, cell proliferation-promoting agents, and the like) by inclusion in screening assays described herein. The activity of a modulator may be known, unknown or partially known.

The term "test chemical" refers to a chemical to be tested by one or more screening method(s) of the invention as a putative modulator.

The terms "label" or "labeled" refers to incorporation of a detectable marker, e.g., by incorporation of a radiolabeled amino acid or attachment to a polypeptide of biotinyl moieties that can be detected by marked avidin (e.g., streptavidin containing a fluorescent marker or enzymatic activity that can be detected by optical or colorimetric methods). Various methods of labeling polypeptides and glycoproteins are known in the art and may be used. Examples of labels for polypeptides include, but are not limited to, the following: radioisotopes (e.g., $^3H$, $^{14}C$, $^{35}S$, $^{125}I$, $^{131}I$), fluorescent labels (e.g., FITC, rhodamine, lanthanide phosphors), enzymatic labels (or reporter genes) (e.g., horseradish peroxidase, β-galactosidase, β-latamase, luciferase, alkaline phosphatase), chemiluminescent, biotinyl groups, predetermined polypeptide epitopes recognized by a secondary reporter (e.g., leucine zipper pair sequences, binding sites for secondary antibodies, metal binding domains, epitope tags). In some embodiments, labels are attached by spacer arms of various lengths to reduce potential steric hindrance.

"Fluorescent label" refers to incorporation of a detectable marker, e.g., by incorporation of a fluorescent moiety to a chemical entity that binds to a target or attachment to a polypeptide of biotinyl moieties that can be detected by avidin (e.g., streptavidin containing a fluorescent label or enzymatic activity that can be detected by fluorescence detection methods). Various methods of labeling polypeptides and glycoproteins are known in the art and may be used. Examples of labels for polypeptides include, but are not limited to dyes (e.g., FITC and rhodamine), intrinsically fluorescent proteins, and lanthanide phosphors. In some embodiments, labels are attached by spacer arms of various lengths to reduce potential steric hindrance.

"Reporter gene" refers to a nucleotide sequence encoding a protein that is readily detectable either by its presence or activity, including, but not limited to, luciferase, green fluorescent protein, chloramphenicol acetyl transferase, β-galactosidase, secreted placental alkaline phosphatase, β-lactamase, human growth hormone, and other secreted enzyme reporters. Generally, reporter genes encode a polypeptide not otherwise produced by the host cell which is detectable by analysis of the cell(s), e.g., by the direct fluorometric, radioisotopic or spectrophotometric analysis of the cell(s) and preferably without the need to remove the cells for signal analysis of a well. Preferably, the gene encodes an enzyme which produces a change in fluorometric properties of the host cell which is detectable by qualitative, quantitative or semi-quantitative function of transcriptional activation. Exemplary enzymes include esterases, phosphatases, proteases (tissue plasminogen activator or urokinase) and other enzymes whose function can be detected by appropriate chromogenic or fluorogenic substrates known to those skilled in the art. Proteins, particularly enzymes, of reporter genes can also be used as probes in biochemical assays, for instance after proper conjugation to either the target or a chemical entity that binds to the target.

"Transmittance" refers to the fraction of incident light that passes through a medium at a given wavelength. It can also be considered the ratio of radiant power transmitted through a medium to the radiant power incident on the medium at a particular wavelength.

Other chemistry terms herein are used according to conventional usage in the art, as exemplified by The McGraw-Hill Dictionary of Chemical Terms (ed. Parker, S., 1985), McGraw-Hill, San Francisco, incorporated herein by reference).

Embodiments of the Invention

As a non-limiting introduction to the breadth of the invention, the invention includes several general and useful aspects, including:

1) multi-well plates with cycloolefin well bottoms that are useful in fluorescence measurements, 2) methods of making (1), and 3) methods and systems of detection based, in part, on (1). These aspects of the invention, as well as others described herein, can be achieved by using the methods and compositions of matter described herein. To gain a full appreciation of the scope of the invention, it will be further recognized that various aspects of the invention can be combined to make desirable embodiments of the invention.

Multi-well Plates

Multi-well plates of the invention comprise a layer of low fluorescence and high transmittance, comprising a cycloolefin polymer, and a well(s) to hold, or form, the layer. The cycloolefin usually comprises at least a portion of a bottom surface of a well of the multiwell plate. In many embodiments, to facilitate ease of manufacture, cycloolefin will comprise substantially the entire bottom. Cycloolefin can also be used to form the walls of the plate, which is a second way of reducing the inherent fluorescence of a plate. In some molded embodiments of the invention, cycloolefin will optionally comprise any portion of a plate, including the plate bottom, well walls, inter-well structural members that interconnect the wells, plate sides, plate upper or lower surfaces, as well as plate lids.

Typically, wells will be arranged in two dimensional linear arrays with greater than 864 wells on a standard microtiter plate footprint. Larger numbers of wells or increased well density can also be easily accomplished since the cycloolefin polymers can be readily made into a variety of well shapes and forms of small dimension and volume. Other commonly used number of wells include 1536, 3456, and 9600. Well volumes typically vary from 500 nanoliters to over 200 microliters, depending on well depth and cross sectional area. Well volumes of 1, 2, 5, 10, 20, and 50 microliters are commonly used. Wells can be made in any cross sectional shape (in plan view) including, square, round, and hexagonal and combinations thereof. Wells can be made in any cross sectional shape (in vertical view) including, shear vertical walls with flat or round bottoms, conical walls with flat or round bottoms and curved vertical walls with flat or round bottoms and combinations thereof. In applications of the invention that can utilize focused light the cycloolefin can be used to form a lens that that is part of the well bottom. Lens will vary in thickness and curvature depending on the application.

The materials for manufacturing the plate will typically be polymeric, since these materials lend themselves to mass manufacturing techniques. Polymeric materials can particularly facilitate plate manufacture by molding methods known in the art and developed in the future. Polymers that are compatible with cycloolefin should be used in regions of the plate in physical contact with cycloolefin. In some embodiments plate wells can be manufactured with a material other than a cycloolefin polymer and the cycloolefin bonded, welded or otherwise fused to the second material. Polymers with glass transition temperatures suitable for heat induced fusion with cycloolefin can be selected for manufacturing the wells and other portions of the plate. Preferably, polymers are selected that have low fluorescence or other properties described herein. The entire plate except for the bottom can be made of a second polymer and then heat welded to a cycloolefin film of the appropriate dimensions using methods as known in the art or developed in the future. It is also preferred to make a substantial portion or the entire plate of cycloolefin Since most measurements will not typically require light to pass through the wall of the well, polymers can include pigments to darken well walls or absorb light. Such application of pigments will help reduce background fluorescence. Pigments can be introduced by any means known in the art, such as coating or mixing during the polymerization process. Pigment selection can be based on a mixture of pigments to dampen all background inherent to the polymer, or a single pigment or ensemble of pigments selected to filter or absorb light at desired wavelengths. Pigments can include carbon black. Such pigmentation is generally not desired in embodiments where light is directed through the well walls as a method for illuminating the contents of the wells.

The thickness of the cycloolefin comprising the plate bottom can vary depending on the overall properties required of the plate bottom that may be dictated by a particular application. Such properties include the amount of intrinsic fluorescence, rigidity, breaking strength and manufacturing requirements relating to the cycloolefin used in the plate. Well bottom cycloolefin layers typically have a thickness about 30 to 500 microns thick, and preferably about 50 to 300 microns thick.

One of the outstanding features of the multi-well plates of the present invention is their low intrinsic fluorescence. The bottom layer comprised of cycloolefin typically produces about 400 percent to 200 percent or less of the fluorescence compared to fused silica of 150 micron thickness. Fused silica glass is typically used a "gold standard" for comparison of relative fluorescence. Fluorescence and relative fluorescence can be measured using any reliable techniques known or developed in the art, preferably the techniques described herein. Preferably, the fused silica standard used herein to show the surprisingly low fluorescence of cycloolefin is used as a standard. Preferably, the bottom layer comprised of cycloolefin typically produces about 100 to 50 percent or less of the fluorescence compared to fused silica of about 150 micron thickness. The amount of intrinsic fluorescence can be dictated, in part, by the layer thickness. In some applications that can tolerate particularly thin layers, such as applications where the layer does not require significant structural strength, layer thickness can be quite thin (e.g., 20 to 80 microns) in order to reduce fluorescence arising from the layer. The thinness of a layer is usually also balanced against the difficulty of uniformly welding or generating thinner layers in manufacturing processes. The low relative fluorescence of cycloolefin devices is usually present at excitation wavelengths between about 300 to 400 nm and at emission wavelengths between about 300 to 800 nm. Such relative fluorescence values can also be used as a guide for forming other embodiments of the invention.

The multi-well plates of the present invention can include coatings or surface modifications to facilitate various applications of the plate as described herein and known or developed in the relevant art. Coatings can be introduce any suitable method known in the art, including printing, spraying, radiant energy, ionization techniques or dipping. Surface modifications can also be introduced by appropriately derivatizing a polymer before or after the manufacture process by including an appropriate derivatizing polymer in the cycloolefin layer. The derivatized polymer can then be reacted with a chemical moiety that is used in the application of the plate. Prior to reaction with a chemical moiety, such polymer can then provide either covalent or non-covalent attachment sites on the cycloolefin. Such sites in or on the cycloolefin surface can be used to attach moieties, such as assay components (e.g., one member of a binding pair), chemical reaction components (e.g., solid synthesis components for amino acid or nucleic acid synthesis), and cell culture components (e.g., proteins that facilitate growth or adhesion). Examples of derivatized polymers include those described by U.S. Pat. No. 5,583,211 (Coassin et al). Particularly preferred embodiments are based on polyethylene and polypropylene derivatives that can be include as cycloolefin copolymers. The cycloolefin layer can also include a plurality of living cells. Such embodiments are useful for cell based assays described herein and for growing cell using culture methods. Plates of the invention can include a coating (e.g., polylysine) to enhance attachment of cells.

Uses for multi-well plates are known in the relevant arts and include diagnostic assays, chemical or biochemical binding assays, filtration assays, chemical synthesis sites, storage sites, and the like. Such uses can also be applied to the present invention. It will be recognized that some types of multi-well plates for spectroscopic measurements can often be used for other multi-well plate applications. Typically, a multi-well plate is used for detecting a signal from a sample. Different types of signal measurements are discussed herein.

In another embodiment, the invention provides for a multi-well plate for spectroscopic measurements, comprising a plurality of wells and each well comprising a wall and a bottom with a low fluorescence and high transmittance portion comprising a cycloolefin copolymer, and a frame, wherein the wells are disposed in a frame. The multi-well plate can be used for detecting a signal from a sample. The footprint of a standard 96-well microtiter plate is 12.7 cm in length and 8.5 cm in width. The generally accepted standard footprint for a standard 96-well microtiter plate for robotic applications is 12.77±0.25 cm in length and 8.55±0.25 cm in width (see T. Astle, Standards in Robotics and Instrumentation, J. of Biomolecular Screening, Vol. 1 pages 163–168 (1996)). In no case will the standard footprint be greater or less than the range of lengths and widths presented in Table 1, which is a maximum of 12.83 cm and a minimum of 12.63 cm for the length and a maximum of 8.63 cm and a minimum of 8.37 cm for the width.

TABLE 1

| Mfrs Cat. # | Mfrs Name | Outside Dimensions | | | Wells | | | |
| --- | --- | --- | --- | --- | --- | --- | --- | --- |
| | | Length | Width | Height | Wells Shape | Color | Material | Bottom |
| | AGTC | 128.118 | 85.319 | 41.148 | | | styrene | 1 ml |
| | AIM | 127.762 | 85.598 | 41.504 | | | styrene | 1 ml |
| | AIM | 127.635 | 85.141 | 40.945 | | | propylene | 1 ml |

TABLE 1-continued

| Mfrs Cat. # | Mfrs Name | Outside Dimensions | | | Wells | | | | |
|---|---|---|---|---|---|---|---|---|---|
| | | Length | Width | Height | Wells | Shape | Color | Material | Bottom |
| | Beckman | 127.93 | 85.55 | 41.84 | 96 | round | clear | styrene | round |
| | Beckman | 127.93 | 85.55 | 41.84 | 96 | round | translucent | propylene | round |
| 373660 | Beckman | 127.787 | 85.573 | 14.224 | | | clear | styrene | flat |
| 25870 | Corning/Costar | 127.68 | 85.12 | 14.2 | 96 | round | clear | styrene | flat(bezel) |
| 35207 | Corning/Costar | 127.61 | 85.166 | 14.224 | | | clear | styrene | flat |
| 35205 | Corning/Costar | 127.33 | 85.014 | 14.224 | | | clear | styrene | U-Bottom |
| | Corning/Costar | 127.6 | 85.2 | 14.3 | 96 | round | clear | styrene | cone |
| 7000003 | Corning/Costar | 127.1 | 85.3 | 14.3 | 96 | round | black | styrene | flat |
| 7000004 | Corning/Costar | 127.6 | 85.47 | 14.2 | 96 | round | black | styrene | flat |
| 7000008 | Corning/Costar | 126.7 | 84.62 | 14.45 | 96 | round | translucent | propylene | round |
| 7000010 | Corning/Costar | 127.83 | 85.42 | 14.53 | 96 | round | clear | styrene | flat |
| 35203 | Corning/Costar | 127.508 | 85.319 | 14.224 | | | clear | styrene | flat |
| 35202 | Corning/Costar | | 85.42 | 14.326 | | | clear | styrene | flat A/2 |
| 35190 | Dynatech | 127.889 | 85.649 | 14.173 | | | clear | styrene | flat |
| 35189 | Dynatech | 127.838 | 85.522 | 14.097 | | | clear | styrene | V-Bottom |
| 35194 | Evergreen | 127.483 | 85.344 | 14.376 | | | clear | styrene | flat |
| 35192 | Evergreen | 127.483 | 85.217 | 14.275 | | | clear | styrene | U-Bottom |
| 35191 | Evergreen | 127.432 | 85.268 | 14.3 | | | clear | styrene | V-Bottom |
| 35197 | Falcon | 127.381 | 85.471 | 14.351 | | | clear | styrene | flat |
| 7000017 | Genetix | 128.28 | 86.31 | 10.17 | 384 | round | clear | styrene | flat |
| 35188 | Immulon | 127.406 | 85.344 | 14.402 | | | clear | styrene | flat |
| 35176 | Interlab | 127.914 | 85.852 | 13.665 | | | clear | styrene | V-Bottom |
| | Iwaki | 127.279 | 85.065 | 14.021 | | | | styrene | flat |
| 35181 | LabSystems | 127.838 | 85.598 | 15.291 | | | black | propylene | flat |
| 35187 | MicroFluor | 127.406 | 85.217 | 12.224 | | | white | propylene | flat |
| 35184 | MicroFluor | 127.508 | 85.42 | 14.275 | | | black | propylene | flat |
| 35183 | MicroFluor | 127.533 | 85.42 | 14.224 | | | white | propylene | flat A/2 |
| 35185 | MicroLite | 127.584 | 85.369 | 14.148 | | | white | propylene | flat |
| 35186 | MicroLite 2 | 127.635 | 85.471 | 14.199 | | | white | propylene | flat |
| | Millipore | 128.016 | 85.75 | 14.859 | | | white | propylene | flat |
| | Millipore | 127.813 | 85.598 | 14.605 | | | clear | styrene | flat |
| 35177 | NBT | 127.838 | 85.598 | 14.3 | | | clear | styrene | U-Bottom |
| 7000001 | Nunc | 127.6 | 83.7 | 14.4 | 96 | round | clear | styrene | flat |
| 7000006 | Nunc | 127.7 | 85.6 | 14.5 | 384 | square | clear | styrene | flat |
| 63765 | Nunc | 127.559 | 85.573 | 14.351 | | | clear | styrene | flat |
| 35201 | Nunc | 127.432 | 85.344 | 14.097 | | | clear | styrene | U-Bottom |
| 35200 | Nunc | 126.314 | 84.379 | 14.351 | | | | propylene | U-Bottom |
| 35199 | Nunc | 127.305 | 85.395 | 14.402 | | | clear | styrene | V-Bottom |
| 35210 | Packard | 127.762 | 85.471 | 14.275 | | | white | propylene | GF/B |
| 35209 | Packard | 127.965 | 85.776 | 14.351 | | | white | propylene | GF/C |
| 35203 | Pall | 127.635 | 85.598 | 14.325 | | | white | propylene | flat |
| 7000005 | Polyfiltronics | 127.5 | 85.8 | 44.03 | 96 | square | translucent | propylene | round |
| 7000009 | Polyfiltronics | 127.09 | 85.12 | 30.43 | 96 | round | translucent | propylene | filter |
| 7000011 | Polyfiltronics | 127.3 | 85.25 | 16 | 96 | round | translucent | propylene | cone |
| 7000012 | Polyfiltronics | 127.8 | 85.69 | 9.56 | 384 | round | translucent | propylene | cone |
| 35175 | Polyfiltronics | 127.787 | 85.552 | 15.24 | | | white | propylene | flat |
| 35174 | Polyfiltronics | 127.483 | 85.547 | 15.189 | | | black | propylene | flat |
| 35173 | Polyfiltronics | 127.991 | 85.7 | 15.24 | | | white | Propylene | Clear–flat |
| 35179 | Polyfiltronics | 127.559 | 85.344 | 14.351 | | | white | Propylene | GF/B |
| 35180 | Polymetrics | 127.533 | 85.369 | 14.097 | | | translucent | Propylene | Deep V |
| | Sumilon | 127.33 | 85.395 | 14.503 | | | | Styrene | flat |
| 35178 | Tilertek | 127.381 | 85.319 | 14.224 | | | clear | Styrene | flat |

Typically, the multi-well plate has wells with a well center to well center distance of less than about 2.5 mm, preferably less than 2 mm and some times less than 1 mm. Smaller well to well distances are preferred for smaller volumes. Such plates typically have a cycloolefin polymer thickness between about 20 and 200 microns thick, preferably about 30 and 80 microns. Preferably, the cycloolefin polymer has low fluorescence from light of about 300 to 500 nm and the low fluorescence and high transmittance portion is substantially the entire bottom. Often the wells and optionally the frame is made of a cycloolefin copolymer, which helps reduce fluorescence.

The present invention only includes multi-well plates with a footprint of a standard 96-well microtiter plate and having greater than 864 microtiter wells.

Materials, Selection Criteria and Testing

This section describes materials, selection criteria and rapid tests to facilitate choosing a cycloolefin for the multi-well plates described herein.

Materials

The present inventors conducted extensive research on different polymers in search of polymers that offer the appropriate properties for detecting spectroscopic signals, particularly fluorescence signals. The materials used in the present invention have not been used in commercially available plates listed in Table 1. Surprisingly, these materials offer exceptional properties, including low intrinsic fluorescence, which was demonstrated herein for the first time. "Cycloolefins" refer generally to cycloolefin polymers, unless otherwise modified in the context of its usage, and includes copolymers such as those so specified herein. "Cycloolefin copolymers" refer generally to cycloolefin copolymers, unless otherwise modified in the context of its usage.

Typically, cycloolefins are used as either films or resins to make various embodiments of present invention. Resins and films based on cycloolefin polymers can be used in various manufacturing processes known in the relevant art and described herein. Selection criteria for cycloolefin films or resins is described more fully below. Generally, Cycloolefin films or resins that contain UV-ray absorbers, aromatic moieties, contain styrene moieties are not preferred.

Suitable cycloolefins for many embodiments of the present invention include those described in U.S. Pat. Nos. 5,278,238 (Lee B. L. et al); 4,874,808 (Minami et al); 4,918,133 (Moriya et al); 4,935,475 (Kishimura et al); 4,948,856 (Minchak et al); 5,115,052 (Wamura et al); 5,206,306 (Shen); 5,270,393 (Sagane et al); 5,272,235 (Wakatsuru et al); 5,278,214 (Moriya et al); 5,534,606 (Bennett et al); 5,532,030 (Hirose et al); 4,689,380 (Nahm et al); and 4,899,005 (Lane et al). Cycloolefins available from Hoechst are preferred, especially cycloolefin (e.g., cyclopentene, cyclohexane, and cycloheptene) and their polyethylene copolymers, as well as the thermoplastic olefin polymers of amorphous structure (TOPAS line).

Multilayer laminates are preferred when multiple functional requirements are difficult to obtain from a single laminate (e.g., layer or film). The properties of transmittance, rigidity, heat sealability, fluorescence, moisture penetration can be blended by the use of films of differing resins. Blended resins known in the art and developed in the future can be used when multilaminate films or blended resins have properties consistent with those of the present invention. For example, U.S. Pat. No. 5,532,030 (Hirose et al) describes the manufacture of certain cycloolefin films, both single and multilaminate, that can be adapted for use in the devices described herein.

Selection Criteria and Testing

Desirable properties for cycloolefin films and resins used in the present invention will vary depending on the type of multi-well plate desired. Generally, the materials are selected to yield a final product with low fluorescence, high transmittance, sufficient rigidity to resist deformity and to allow for substantially single plane (especially for spectroscopic embodiments), good chemical inertness, relatively low cytotoxicity, low water absorption, heat resistance/ deflection up to about 150° C., and resistance to acids and bases. Starting materials with good molding properties are particularly desirable.

Fluorescence of the films or final product can be readily measured. Such measurements proceed rapidly and a number of films (e.g. 20 to 80 films) or prototype products can be rapidly tested within a matter of hours or days, usually less than one person week. Consequently, films or resins used to make final products can rapidly be selected for the desired properties that are important in a particular application. The fluorescence measurements can be used as described herein or those known in the art, so long as the measurements or comparable (or better) in sensitivity to the measurements described herein. A standard reference point for relative fluorescence, such as the standard described herein, is particularly useful for comparing different cycloolefins and for determining their applicability to certain applications. Relative fluorescence properties described herein are particularly desirable. Similarly, transmittance can be measured using techniques known in the relevant art.

In the final product, layer thicknesses of generally, about 20 to 500 microns, are most likely to impart the properties desirable for use in the devices described herein, especially low fluorescence and high transmittance. Although thinner or thicker films, such as about 10 to 1,500 microns, can be used in applications where the demands for extremely low fluorescence and high transmittance films are less stringent, or when there is little loss in the desired properties as function of film thickness. Preferably, film thickness is between about 30 to 200 microns for multi-well plate applications, and more preferably between about 80 to 200 microns and most preferably between about 80 to 200 microns. Preferably, film thickness is between about 30 to 600 microns for scaffolding applications where the film typically contributes to a structural function in the device that usually demands more strength or rigidity, and more preferably between about 100 to 500 microns and most preferably between about 120 to 200 microns. Preferably, film thickness is between about 75 to 600 microns for the thinner regions of injection molded applications where the film typically contributes to a structural function, and more preferably between about 100 to 500 microns and most preferably between about 120 to 200 microns. Film thickness refers to the thickness of the film used (or material thickness). Layer thickness is generally about 100 to 200 percent of film thickness, preferably about 100 to 150 percent of film thickness and more preferably about 100 to 125 percent of film thickness.

In the final product, breaking stresses ($Kg/cm^2$ at 22° C.) of generally, about 400 to 3,000 $Kg/cm^2$ are most likely to impart the properties desirable for use in the devices described herein, especially rigid devices of low fluorescence and high transmittance. Although weaker or stronger films, such as about 200 to 3,500 $Kg/cm^2$, can be used in different applications based on the demands for breaking strength of the device. For example, the breaking strength of the film, generally, need not be as great for the bottoms of multi-well plates as for applications where the film is part of the frame in a multi-well plate. Preferably, breaking stress is between about 500 to 2,000 $Kg/cm^2$ for multi-well plate applications, and more preferably between about 800 to 1,600 $Kg/cm^2$ and most preferably between about 900 to 1,400 $Kg/cm^2$. Preferably, breaking stress for platform/ scaffolding applications is about 15 to 60 percent higher than for multi-well plate applications. Breaking stresses can be measured by standard techniques as known in the art.

Manufacturing Methods

The present invention includes a process for making a cycloolefin based multi-well plates. A variety of processes can be used including heat welding, insert molding, injection molding and other processes described herein and known in the art. One process comprises heat welding wells to a polymer layer with low fluorescence and high transmittance, comprising a cycloolefin copolymer. Processes typically use a cycloolefin copolymer selected from the group of cyclopentene polyethylene copolymer, cyclohexane polyethylene copolymer, and cycloheptene polyethylene copolymer. The process can alternatively, or optionally, comprise the step of exposing the layer and the polymer to a sufficient amount of radio frequency energy to promote internal heating of the layer and the polymer, or ultrasonic welding. Alternatively the process can entail heating the layer and the polymer that forms the wells to about 220 C. for a sufficient amount of time to allow fusion of the polymers. Pressure can be applied to enhance the welding process (e.g., about 100 and 1,000 PSI of pressure to the layer and the polymer for low pressure processes using low viscosity monomer solutions and about 10,000 to 25,000 PSI for high pressure processes such as insert molding).

In another embodiment, the invention provides for a process for making multi-well plates by injection molding. Injection molding techniques known in the art or developed in the future can be applied. The process comprises insert molding at least a well to a bottom of the well of the multi-well plate, wherein the bottom is a cycloolefin copolymer. Using this method cycloolefin films can be basically heat fused to the supporting structure (e.g., well walls) to make a plate. The entire well or plate can also be a cycloolefin. Inserting molding can be performed between about 195 and 350° C. degrees, preferably resins are heated to 260 to 320 C. Pressures used are typically between 10,000 and 25,000 PSI and preferably about 15,000 to 22,000 PSI.

Methods for preparing of cycloolefins and their polymers have been described. Older methods and cycloolefins were described in U.S. Pat. Nos. 4,002,815; 4,069,376; 4,110,528; 4,262,103 and 4,380,617 (by Robert J. Minchak and co-workers). A number of catalysts can be used in the manufacture of cycloolefins as known in the art or developed in the future and can be used to manufacture materials for various embodiments of the present invention. Such catalysts include those described in U.S. Pat. Nos. 5,278,238 (Lee et al) and 5,278,214 (Moriya et al). Regardless of the exact type of catalyst system utilized, cycloolefin monomers can be polymerized in the presence of a catalyst and the ethylene based functional copolymers to make embodiments of the invention suitable for injection molding. Polymerization can carried out preferably in bulk. Bulk polymerization including reaction injection molding (RIM), liquid injection molding (LIM), reinforced reaction injection molding RRIM, and resin transfer molding (RTM), and combinations thereof are known to the art well as those techniques developed in the future. Bulk polymerization is polymerization conducted in the absence of a solvent or a diluent. Reaction injection molding is a type of bulk polymerization wherein a monomer in a liquid state is transferred or is injected into a mold where polymerization of the monomer takes place in the presence of a catalyst system. RIM is not conventional injection molding for melt polymers and is readily distinguishable therefrom.

RIM is a low pressure, one-step or one-shot, mix and injection of two or more liquid components into a closed mold where rapid polymerization occurs resulting in a molded plastic product. RIM differs from conventional injection molding in a number of important aspects. Conventional injection molding is conducted at pressures of about 10,000 to 20,000 psi in the mold cavity by melting a solid resin and conveying it into a mold maintained at a temperature less than the melt temperature of the resin. At an injection temperature of about 150° to 350° C., viscosity of the molten resin in conventional injection molding process is generally in the range of 50,000 to 1,000,000 and typically about 200,000 cps. In the injection molding process, solidification of the resin occurs in about 10 to 90 seconds, depending on the size of the molded product, following which, the molded product is removed from the mold. There is no chemical reaction occurring in a conventional injection molding process when the resin is introduced into a mold.

In a RIM process, viscosity of the materials fed to a mix chamber is about 1 to 10,000 cps, preferably 1 to about 1500 cps, at injection temperatures varying from room temperature for to about 100° C. for different cycloolefin monomer systems. Mold temperatures in a RIM process are in the range of about 50° C. to 150° C. and pressures in the mold are generally in the range of about 50 to 150 PSI. At least one component in the RIM formulation is a monomer that is polymerized to a polymer in the mold. The main distinction between conventional injection molding and RIM resides in the fact that in RIM, a chemical reaction is initialed on mixing, with optional heating, and is completed in the mold to transform monomers to a polymeric state. For practical purposes, the chemical reaction must take place rapidly in less than about 2 minutes. Conventional injection molding can also be used to make various embodiments of the invention. The term injection molding refers to both conventional injection molding and the other types of injection molding described herein and known or developed in the art.

A LIM process is similar to a RIM system except that generally an impingement head is not utilized. Instead, a simple mixer is utilized such as a static mixer, an agitating mixer, and the like. Moreover, in a LIM system, the injection molding cycle is carried out over a longer period of time and thus the chemical reaction can take place in a period of up to about 5 or 10 minutes.

Various reinforcing particles can also be utilized, that is injected with the solution when utilizing either the RIM or the LIM process. As a practical manner, the RIM process is not always suitable and hence reinforced particles are generally utilized only in a LIM process, that is a reinforced liquid injection molding process. Another alternative is to utilize a mat that already exists in a mold, for example a fiberglass mat, or the like. Accordingly, such systems are called RMRIM, RMLIM, or RTM. Due to the reaction cure times as well as injection molding times, the RMLIM system is generally preferred for some operations, RMRIM or RTM for others.

Hence, the blends or alloys of cycloolefins and suitable copolymers can he utilized in any of the above noted bulk polymerization systems as well as variations thereof. In as much as the above systems are generally conventional or known to the art as well as to the literature, they have not been discussed in detail, but rather briefly discussed herein for purposes or brevity.

U.S. Pat. No. 4,426,502 to Minchak describes bulk (e.g., RIM) polymerization of cycloolefins using a modified co-catalyst with a catalyst whereby polymerization of the cycloolefin monomers can be conducted in absence of a solvent or a diluent. The alkylaluminum halide co-catalyst is modified by pre-reacting it with an alcohol or an active hydroxy-containing compound to form an alkyoxyalkylaluminum halide or an aryloxyalk-ylaluminum halide that is then used in the polymerization reaction. The prereaction can be accomplished by using oxygen, an alcohol, or a phenol. Such modification of the co-catalyst results in lowering of its reducing potential of the catalyst.

Regardless of whether the halide metathesis or the halogen-free metathesis catalyst system is utilized, the reaction rate is generally slowed down by utilization of the above-described alcohols. Thus, depending if little or no alcohol is utilized, the halide metathesis catalyst system can cure the various cycloolefins in a matter of minutes and even seconds. If high amounts of alcohol are utilized, the cure can be a matter of hours and even days.

It is important to lower the reducing power of the co-catalyst of either metathesis system in order to make such bulk polymerization reactions practical. When a monomer diluted with unmodified alkylaluminum co-catalyst is mixed with a monomer-diluted catalyst to polymerize a cycloolefin, the reaction is very rapid. In such systems, the polymerization is usually unacceptable because polymer formed at the interfaces or the two streams during intermingling prevents thorough mixing and results in poor conversions. Modifying the co-catalyst by pre-reaction with hydroxy-containing materials reduces the activity of the co-catalyst to the point where adequate mixing of the liquid components can occur and acceptable polymer products can be produced. Sometimes, a cycloolefinic monomer will contain various impurities that naturally reduce the activity of the co-catalyst. In such cases, it is not necessary to add active hydroxy-containing materials to reduce the activity of the co-catalyst. With the modified co-catalyst, mixing or the cycloolefins, and other components, can be carried out at lower temperatures, such as room temperature, without immediately initiating polymerization. The co-catalyst can be formulated to allow a reasonable pot life at room temperature and thermal activation in the mold of the mixed liquid components. The co-catalyst can also be formulated to give mixing initiated RIM systems.

When utilizing a bulk polymerization method, the blend of the cycloolefin monomers and the ethylene-based functional copolymers as well as the catalyst and any optional additives therein can be added to a bulk polymerizing mold having a temperature well below the Tg of the polymerized cycloolefin polymers. This is especially desirable since the reaction is usually exotheromic and can result in a temperature increase of the mold up to about 120° C. The final mold temperature is thus from about 50° C. to about 200° C., generally from about 50° C. to about 150° C. and preferably from about 50° C. to about 90° C. Of course, such temperatures will vary depending upon the specific type of catalyst system utilized, the specific type of cycloolefin monomers, and the like. When utilizing the catalyst systems described herein above, the cycloolefin monomer and ethylene-based functional co-polymer mixture has a good shelf life, that is up to about 24 hours. Should longer times be desirable, the catalyst system is not added to the mixture but kept separate. Thus, upon the point in time of carrying out the polymerization of the cycloolefin monomers, the catalyst system is added to the mixture and polymerized in bulk. A preferred method of polymerization includes the above noted RIM method.

Methods of Detecting Signals From Samples

The present invention also provides for a method of detecting a signal, comprising contacting a sample with a device for spectroscopic measurements, comprising: a layer with low fluorescence and high transmittance, comprising a cycloolefin copolymer, and a plate to hold the layer wherein the multi-well plate of the invention is for detecting a signal from a sample, and detecting a signal from the sample. Preferably the detecting comprises detecting epifluorescence from underneath the multi-well plate. The detecting step can also utilize an optical array that corresponds to the density of wells in the multi-well plate. Various labels may be employed in assays using the present invention. Often it will be desirable to provide attachment sites in a multi-well plate for use as part of the assay system. Such labels may be directly or indirectly attached to the polymer surface. Different spectroscopic techniques can be employed with the present invention, such as colorimetric, spectrophotometric, luminescent, and fluorescence methods. Non-spectroscopic methods based on light can be employed such as refraction and reflectance methods.

Fluorescence Measurements

It is recognized that different types of fluorescent monitoring systems can be used to practice the invention with fluorescent probes, such as fluorescent dyes or substrates. Preferably, systems dedicated to high throughput screening, e.g., 96-well or greater microtiter plates, are used. Methods of performing assays on fluorescent materials are well known in the art and are described in, e.g., Lakowicz, J. R., *Principles of Fluorescence Spectroscopy,* New York: Plenum Press (1983); Herman, B., Resonance Energy Transfer Microscopy, in: *Fluorescence Microscopy of Living Cells in Culture, Part B, Methods in Cell Biology,* vol. 30, ed. Taylor, D. L. & Wang, Y. -L., San Diego: Academic Press (1989), pp. 219–243; Turro, N. J., *Modern Molecular Photochemistry,* Menlo Park: Benjamin/Cummings Publishing Col, Inc. (1978), pp. 296–361 and the Molecular Probes Catalog (1997), OR, USA.

Fluorescence in a sample can be measured using a detector described herein or known in the art for multi-well plates. In general, excitation radiation, from an excitation source having a first wavelength, passes through excitation optics. The excitation optics cause the excitation radiation to excite the sample. In response, fluorescent probes in the sample emit radiation that has a wavelength that is different from the excitation wavelength. Collection optics then collect the emitted light from the sample. The device can include a temperature controller to maintain the sample at a specific temperature while it is being scanned. According to one embodiment, a multi-axis translation stage (e.g., a dedicated X,Y positioner) moves a microtiter plate holding a plurality of samples in order to position different wells to be exposed. The multi-axis translation stage, temperature controller, auto-focusing feature, and electronics associated with imaging and data collection can be managed by an appropriately programmed digital computer. The computer also can transform the data collected during the assay into another format for presentation.

Preferably, FRET (fluorescence resonance energy transfer) is used as a way of monitoring probes in a sample (cellular or biochemical). The degree of FRET can be determined by any spectral or fluorescence lifetime characteristic of the excited construct, for example, by determining the intensity of the fluorescent signal from the donor, the intensity of fluorescent signal from the acceptor, the ratio of the fluorescence amplitudes near the acceptor's emission maxima to the fluorescence amplitudes near the donor's emission maximum, or the excited state lifetime of the donor. For example, cleavage of the linker increases the intensity of fluorescence from the donor, decreases the intensity of fluorescence from the acceptor, decreases the ratio of fluorescence amplitudes from the acceptor to that from the donor, and increases the excited state lifetime of the donor.

Preferably, changes in signal are determined as the ratio of fluorescence at two different emission wavelengths, a process referred to as "ratioing." Differences in the absolute amount of probe (or substrate), cells, excitation intensity, and turbidity or other background absorbances between addressable wells can affect the fluorescence signal. Therefore, the ratio of the two emission intensities is a more robust and preferred measure of activity than emission intensity alone.

A ratiometric fluorescent probe system can be used with the invention. For instance the reporter system described in PCT publication WO96/30540 (Tsien) has significant advantages over existing reporters for gene integration analysis, as it allows sensitive detection and isolation of both expressing and non-expressing single living cells. This assay system uses a non-toxic, non-polar fluorescent substrate which is easily loaded and then trapped intracellularly. Cleavage of the fluorescent substrate by β-lactamase yields a fluorescent emission shift as substrate is converted to product. Because the β-lactamase reporter readout is ratiometric, it is unique among reporter gene assays in that it controls variables such as the amount of substrate loaded into individual cells. The stable, easily detected, intracellular readout simplifies assay procedures by eliminating the need for washing steps, which facilitates screening with cells using the invention.

Detector

In one embodiment the invention provides for a detector to monitor spectroscopic events with the multi-well plates. Preferably, the detector is a fluorescence detector and more preferably of the type that can be used for epi-fluorescence. Detectors are described in U.S. Pat. No. 5,589,351 (Harootunian), U.S. Pat. No. 5,355,215 (Schroeder), and PCT patent application WO 93/13423 (Akong).

The detector is preferably capable of fluorescence emission measurements in the 400 to 800 nm range. Typically, the detector comprises a means for excitation of fluorescence in the 350 to 800 nm range. The detector is often capable of many different operating modes that facilitate drug discovery assay requirements. These operating modes can include: single excitation wavelength with single emission wavelength detection, single excitation wavelength, dual emission wavelength detection, sequential dual excitation wavelength with dual emission wavelength detection and ratio measurement determination, sequential dual excitation wavelength with four emission wavelength detection and ratio measurement determination, homogeneous time resolved fluorescence with single excitation wavelength and single emission wavelength detection, homogeneous time resolved fluorescence with single excitation wavelength and dual emission wavelength detection and ratio determination measurement, homogeneous time resolved fluorescence with sequential dual excitation wavelength and dual emission wavelength detection and ratio determination measurement, dual sequential excitation wavelengths and single emission wavelength detection with ratio determination measurement, luminescence measurement at a single wavelength with luminescence measurement at dual wavelengths, luminescence measurement at dual wavelengths with a ratio determination, and time resolved fluorescence emission (intrinsic dye properties with or without a binding event). The detector preferably functions in the epi-fluorescence mode where the preferred illumination is from the bottom of the plate and the preferred collection is also from the bottom of the plate. The detector can function in all of the above mentioned modes with bottom viewing of the plate.

The ratio mode of the detector enables changes in signal levels with respect to relative signal levels to be observed without complex calibration. The ratio mode of the detector is tolerant of differences in the quantities of isolated targets, cells or dye loading into cells. Hence, differences between wells can exist for the cells and dye levels, but within a single well, these differences can be normalized to relative change in the intensities. Without ratiometric detection, absolute signal levels can obscure the slight changes within each well.

The selection of different operating modes of the detector is often based on the type of assay to be performed. Thus, the detector is usually designed with numerous modes of operation to provide flexibility in detection. Each mode is selected based on its compatibility with a particular set of fluorescent probes and reagents. The detection is then tailored to meet the assay's and the probe's requirements.

The present invention also provides a system for spectroscopic measurements. The system comprises reagents for 1) an assay, 2) a device, comprising a layer with low fluorescence and high transmittance, comprising a cycloolefin copolymer, and a multi-well plate to hold the layer. The system can further comprise a detector.

EXAMPLES

Example 1

Fluorescence Properties of Cycloolefins Compared to Glass and Other Polymeric Materials To investigate the fluorescence properties of various selected films, different polymeric films were tested for fluorescence emission at predetermined excitation wavelengths and compared to two types of fused silica glass sheets (standard). These experiments were conducted using a SPEX Fluorolog 111 Fluorimeter with excitation wavelengths between 315 and 425. The films and glass materials were disposed on a holder. The sample was positioned with the excitation beam perpendicular to the sample face. The fluorescent emission from the sample was collected off angle at about 12.5 degrees. The material's fluorescence emission was reflected off of a mirror and onto a monochromometer. The emission radiation was selected by the monochromatic grating and was detected by the photomultiplier tube of the instrument. The SPEX Fluorolog 111 Fluorimeter utilizes raman radiation lines of water to calibrate and background correct the instrument measurements from day to day. This background correction was performed each day before instrument use for calibration. The calibration file is stored with the measurements made that day and then subsequent and future measurements with the SPEX instrument can be compared directly and can be corrected for instrument fluctuation.

The materials tested were 1) fused silica sheets (Corning Glass Works cover-slip No 1 (catalog number 2935/583331) 2) polystyrene films (ps1, ps2 (from Plastic Suppliers) and ps3 (from Dow Chemical Company), 3) polycarbonate films (pc1 (from General Electric Corporation) and pc2 (from Plastic Suppliers); 4) non-aromatic, alkyl polymers (nap; obtained from Mobil Oil Company), 5) cycloolefin copolymer film (coc; obtained from Hoechst Topas) and 6) Aclar (a fluorocarbon material from Allied Signal).

Table 2 shows the fluorescence normalized emission data over 400 to 650 nm at three different excitation wavelengths. The data is normalized to fused silica and to correct for instrumentation fluctuation. Polystyrene, which is often used as a component of multi-well plates (see Table 1), generated high background fluorescence levels, consistent with its aromatic structure. Surprisingly, polycarbonate, which is often a biocompatible polymer, was generally better than polystyrene, especially at longer wavelengths. Surprisingly, the non-aromatic, alkyl polymer was generally the second best polymer across the range of wavelengths tested. Also surprisingly, the cycloolefin copolymer produced the best results and nearly approached the extremely low fluorescence levels of fused silica.

TABLE 2

| | Material | | | | | | | |
|---|---|---|---|---|---|---|---|---|
| Ex = 315 | Em = 400 | Em = 425 | Em = 450 | Em = 475 | Em = 500 | Em = 550 | Em = 600 | Em = 650 |
| Glass | 0.22513 | 0.25824 | 0.26817 | 0.30459 | 0.33107 | 0.38735 | 0.51316 | |
| pc1 - 5 m | 3.31071 | 2.10230 | 2.01953 | 1.78778 | 1.41036 | 0.66876 | 0.60586 | |
| pc2 - 5 m | 11.04128 | 7.04943 | 6.11517 | 5.18091 | 3.79367 | 1.70432 | 1.05317 | |
| ps1 - 2 m | 2.45986 | 1.96447 | 1.93714 | 1.78340 | 1.52374 | 1.02494 | 1.18893 | |
| ps2 - 2 m | 2.20826 | 1.72697 | 1.69866 | 1.64204 | 1.48633 | 1.07582 | 1.18906 | |
| ps3 - 2 m | 4.55807 | 3.29823 | 3.00096 | 2.72352 | 2.34132 | 1.57409 | 1.98743 | |
| Nap - 1.5 m | 1.01919 | 0.75307 | 0.62850 | 0.52942 | 0.50110 | 0.56622 | 1.12111 | |
| Nap - 1.5 m | 0.52658 | 0.48978 | 0.42466 | 0.37654 | 0.38220 | 0.50960 | 1.00787 | |
| Coc - clean | 0.40485 | 0.40485 | 0.34256 | 0.31142 | 0.31142 | 0.41617 | 0.83234 | |
| Aclar - .75 m | 0.08473 | 0.08875 | 0.07864 | 0.07368 | 0.07503 | 0.09701 | 0.22497 | |
| Aclar - 3 m | 0.27245 | 0.28586 | 0.26367 | 0.26522 | 0.29309 | 0.44479 | 1.03199 | |
| Ex = 350 | Em = 400 | Em = 425 | Em = 450 | Em = 475 | Em = 500 | Em = 550 | Em = 600 | Em = 650 |
| Glass | 0.30790 | 0.20526 | 0.23837 | 0.17547 | 0.16222 | 0.17878 | 0.25492 | |

TABLE 2-continued

| | | | | | | | |
|---|---|---|---|---|---|---|---|
| pc1 - 5 m | 0.77802 | 0.62572 | 0.60586 | 0.50323 | 0.42708 | 0.31452 | 0.33769 |
| pc2 - 5 m | 3.96354 | 2.74616 | 2.20826 | 1.61373 | 1.24568 | 0.75024 | 0.62284 |
| ps1 - 2 m | 1.28801 | 1.44858 | 2.22754 | 2.06013 | 1.78340 | 1.06594 | 0.84387 |
| ps2 - 2 m | 1.01919 | 1.34477 | 1.85437 | 1.84021 | 1.64204 | 1.08997 | 0.89180 |
| ps3 - 2 m | 2.13182 | 2.68388 | 3.47092 | 3.14252 | 2.68388 | 1.57692 | 1.29381 |
| Nap - 1.5 m | 0.95408 | 0.80120 | 0.81536 | 0.59170 | 0.53508 | 0.58321 | 0.79554 |
| Nap - 1.5 m | 0.53791 | 0.48695 | 0.55206 | 0.39918 | 0.39918 | 0.48129 | 0.69079 |
| Coc - clean | 0.42466 | 0.38220 | 0.43033 | 0.31142 | 0.31142 | 0.38503 | 0.56056 |
| Aclar - .75 m | 0.08689 | 0.08710 | 0.08669 | 0.07327 | 0.07224 | 0.08050 | 0.10733 |
| Aclar - 3 m | 0.24045 | 0.23323 | 0.24974 | 0.21981 | 0.23375 | 0.31373 | 0.43756 |

| Ex = 400 | Em = 400 | Em = 425 | Em = 450 | Em = 475 | Em = 500 | Em = 550 | Em = 600 | Em = 650 |
|---|---|---|---|---|---|---|---|---|
| Glass | | | 0.29134 | 0.21520 | 0.25492 | 0.18540 | 0.26817 | 0.43039 |
| pc1 - 5 m | | | 0.38073 | 0.30459 | 0.32114 | 0.22844 | 0.31783 | 0.48667 |
| pc2 - 5 m | | | 0.85115 | 0.59736 | 0.62284 | 0.43033 | 0.53791 | 0.77855 |
| ps1 - 2 m | | | 0.55347 | 0.55347 | 0.67646 | 0.43731 | 0.61155 | 0.91561 |
| ps2 - 2 m | | | 0.49544 | 0.50960 | 0.60869 | 0.46996 | 0.65115 | 1.00221 |
| ps3 - 2 m | | | 0.75873 | 0.80120 | 0.97107 | 0.63417 | 0.86065 | 1.24568 |
| Nap - 1.5 m | | | 0.57754 | 0.59170 | 0.67663 | 0.50110 | 0.72476 | 1.08431 |
| Nap - 1.5 m | | | 0.41900 | 0.39635 | 0.50394 | 0.42466 | 0.66248 | 1.05883 |
| Coc - clean | | | 0.32558 | 0.33407 | 0.41900 | 0.37087 | 0.55489 | 0.87198 |
| Aclar - .75 m | | | 0.06295 | 0.06295 | 0.07121 | 0.06966 | 0.10010 | 0.15686 |
| Aclar - 3 m | | | 0.14138 | 0.14654 | 0.17750 | 0.20433 | 0.32405 | 0.47988 |

Example 2

Fluorescence Properties of Cycloolefins Compared to Glass and Other Polymeric Materials To further investigate fluorescence properties of various selected films, different polymeric films were tested for fluorescence emission at predetermined excitation wavelengths and compared to two types of fused silica glass sheets (standard). These experiments were conducted to simulate biochemical or cell-based assays that involve aqueous media. Therefore, films were mounted on a horizontal plastic holder to permit addition of a drop of aqueous media. Three milliliters of water was dispensed onto the film and fluorescence recorded using a Zeiss inverted fluorescence microscope. Background in the absence of a film was recorded and subtracted from signals in the presence of a film.

The materials tested were 1) fused silica sheets (Fisher cover-slip Number 1 (Fisher Catalog number 12-542B (1996)) 2) polystyrene films (ps1, ps2 (from Plastic Suppliers) and ps3 (from Dow Chemical Company), 3) polycarbonate films (pc1 (from General Electric Corporation) and pc2 (from Plastic Suppliers); 4) non-aromatic, alkyl polymers (obtained from Mobil), 5) cycloolefin copolymer film (coc; obtained from Hoechst Topas) and 6) Aclar (a fluorocarbon material from Allied Signal) and 7) Syran Wrap.

Table 3 shows the fluorescence normalized emission data at 460 nm at 350 and 405 nm (excitation wavelengths). The data is normalized to fused silica. Polystyrene, which is often used as a component of multi-well plates (see Table 1), generated high background fluorescence levels, consistent with its aromatic structure as in Example 1. In contrast to Example 1, polycarbonate, which is often a biocompatible polymer, was worse than polystyrene, especially at longer wavelengths. Generally consistent with Example 1, the non-aromatic, alkyl polymer was generally better than polystyrene across the range of wavelengths tested. Generally consistent with Example 1, the cycloolefin copolymer produced the best results and surprisingly out preformed the extremely low fluorescence levels of fused silica. Aclar film also surprisingly produced either low or extremely low fluorescence values relative to fused silica.

TABLE 3

| Material | 350ex/460em | Rank | Material | 405ex/460em | rank |
|---|---|---|---|---|---|
| Fisher #1 coverslip | 1.02 | 1 | Fisher #1 coverslip | 1.03 | 1 |
| Polycarbonate 5 mil | 6.91 | 6 | polycarbonate 5 mil | 19.79 | 6 |
| Polystyrene 2 mil | 3.57 | 5 | polystyrene 2 mil | 3.36 | 4 |
| NAP 1.5 ml | 2.06 | 3 | NAP 1.5 ml | 5.76 | 3 |
| NAP 1.5 ml | 1.33 | 3 | NAP 1.5 ml | 3.51 | 3 |
| coc#2 2 mil | 1.58 | 2 | coc#2 2 mil | 2.60 | 2 |
| coc#1 2 mil | 1.22 | 2 | coc#1 2 mil | 1.59 | 2 |
| aclar sample (>2 yrs old) | 2.62 | 4 | aclar sample (>2 yrs old) | 9.08 | 5 |
| Fisher #1 coverslip | 1.00 | 5 | Fisher #1 coverslip | 1.00 | 1 |
| polycarbonate 5 mil | 5.15 | 9 | polycarbonate 5 mil | 17.75 | 8 |
| polystyrene 1 mil | 2.01 | 7 | polystyrene 1 mil | 2.53 | 7 |
| coc#2 A 2 mil | 1.09 | 6 | coc#2 A 2 mil | 1.71 | 4 |
| coc#2 B 2 mil | 0.89 | 4 | coc#2 B 2 mil | 1.65 | 3 |
| coc#1 2 mil | 0.86 | 3 | coc#1 2 mil | 1.47 | 2 |
| aclar 3 mil (<1 yr old) | 0.71 | 1 | aclar 3 mil (<1 yr old) | 2.34 | 6 |
| aclar 0.75 mil (<1 yr old) | 0.64 | 1 | aclar 0.75 mil (<1 yr old) | 2.14 | 5 |
| syran wrap | 4.18 | 8 | syran wrap | 22.12 | 9 |

Example 3

Cycloolefins are Not CytoToxic To Cultured Cells

The cytotoxicity of cycloolefin was evaluated by incubating cells in cycloolefin multi-well plates for 60 hours at 37° C. 1.8 μL volumes of media containing about 90 Chinese hamster ovary (CHO) were placed in cycloolefin multi-well plates using a tapered pipette. A glass cover was placed over the wells to prevent evaporation. Cells were incubated for 60 hours in a 5% $CO_2$, 37° C., 90% RH incubator. Cells were then tested for viability by loading with the vital dye calcein. The CHO cells were loaded by incubation in a solution containing 4 μM calcein/AM for 30 minutes at room temperature. Cells were inspected using both phase contrast microscopy to determine the total number of cells and fluorescence microscopy to determine the number of live cells. Approximately, greater than 95% of cells were alive as indicated by loading with calcein dye (approximately 200 cells/well).

Example 4

Cycloolefins are Not CytoToxic To Cultured Cells and can be Used for Drug Screening Assays To investigate the cytotoxic properties of cyclolefins, cycloolefin film were tested using an assay for cell viability. CCF2 a vital dye, as described in PCT publication WO96/30540 (Tsien), diffuses into cells and is trapped by living cells having esterase activity that cleaves ester groups on the molecules which results in a negatively charged molecule that is trapped inside the cell. Trapped dye appears green inside of living cells. CCF2 was incubated with Jurkat cells for at least hour in a 1 microliter well having black walls and a cycloolefin bottom, and fluorescence was appropriately monitored. These Jurkat cells were constitutively expressing β-lactamase. Cells were cultured for 60 hours in the conditions of Example 3. After 60 hours β-lactamase activity was measured using CCF2. Cells appeared blue indicating that β-lactamase was indeed active in these cells, which normally do not contain β-lactamase. These results demonstrate that cycloolefins can be used with sensitive fluorescent assays because the films yield low fluorescent backgrounds. This is particularly beneficial because it permits smaller assay volumes (e.g. 2 microliters or less) and the measurement of smaller signals (e.g., from fewer cells or fewer number of isolated biochemical targets).

Publications

All publications, including patent documents and scientific articles, referred to in this application are incorporated by reference in their entirety for all purposes to the same extent as if each individual publication were individually incorporated by reference.

All headings are for the convenience of the reader and should not be used to limit the meaning of the text that follows the heading, unless so specified.

We claim:

1. A multi-well plate, comprising:
   more than 864 wells and each well comprising a wall and a bottom, said bottom with a low fluorescence and high transmittance portion comprising a cycloolefin polymer, and
   a frame, wherein said wells are disposed in said frame,
   wherein said multi-well plate is for detecting a signal from a sample and said multi-well plate has a footprint of a standard 96-well microtiter plate.

2. The multi-well plate of claim 1, wherein said low fluorescence and high transmittance portion is substantially all of said bottom.

3. The multi-well plate of claim 2, wherein said multi-well plate has about 3456 or more wells.

4. The multi-well plate of claim 2, wherein said multi-well plate has wells with a well center to well center distance of less than about 2.5 mm.

5. The multi-well plate of claim 4, wherein said cycloolefin polymer has a thickness between about 20 and 200 microns.

6. The multi-well plate of claim 5, wherein said cycloolefin polymer has a thickness between about 30 and 80 microns thick.

7. The multi-well plate of claim 1, wherein said cycloolefin polymer has a thickness between about 20 and 200 microns.

8. The multi-well plate of claim 7, wherein said cycloolefin polymer has low auto-fluorescence from excitation light of about 300 to 500 nm.

9. The multi-well plate of claim 8, wherein said frame is made of cycloolefin polymer.

10. The multi-well plate of claim 7, wherein said bottom comprises a heat fusion weld with said wall.

11. The multi-well plate of claim 10, wherein said bottom produces about 200 percent or less of the fluorescence compared to fused silica glass of 100 microns thickness at excitation wavelengths between about 300 to 400 nm and at emission wavelengths between about 300 to 800 nm.

12. The multi-well plate of claim 10, wherein said wall comprises a pigment for background reduction.

13. The multi-well plate of claim 12, wherein said bottom further comprises one member of a binding pair.

14. The multi-well plate of claim 12, wherein said bottom further comprises a plurality of living cells.

15. The multi-well plate of claim 12, wherein said bottom is derivatized for attachment of chemical entities.

16. The multi-well plate of claim 15, wherein said bottom further comprises a coating to enhance attachment of biological cells.

17. A process for making a multi-well plate with more than 864 wells and each well comprising a polymer wall, said process comprising:
   heat welding to a polymer wall of said multi-well plate a bottom with low fluorescence and high transmittance, comprising a cycloolefin polymer, and wherein said wells are disposed in said frame and said multi-well plate is for detecting a signal from a sample and said multi-well plate has a footprint of a standard 96-well microtiter plate.

18. The process of claim 17, wherein said polymer is a cycloolefin polymer.

19. The process of claim 18, heat welding yields a cycloolefin bottom between about 30 and 150 microns.

20. The process of claim 19, wherein said heat welding further comprises heating said bottom and said polymer to between about 200 and 300 C. degrees.

21. The process of claim 19, further comprising the step of applying between about 100 and 1,000 PSI of pressure to said bottom and said polymer.

22. A process for making a multi-well plate, comprising:
   insert molding a well, a bottom of said well of said multi-well plate from a cycloolefin polymer,
   wherein said multi-well plate is for detecting a signal from a sample and said multi-well plate has more than 864 wells and a footprint of a standard 96-well microtiter plate.

23. The process of claim 22, insert molding is performed between about 260 and 320 degrees.

24. A kit, comprising:
a) reagents for an assay,
b) a multi-well plate, comprising:
   i) more than 864 wells and each well comprising a wall and a bottom, said bottom with a low fluorescence and high transmittance portion comprising a cycloolefin polymer, and
   ii) a frame, wherein said wells are disposed in said frame,
wherein said multi-well plate is for detecting a signal from a sample and said multi-well plate has a footprint of a standard 96-well microtiter plate.

25. The kit of claim 29, further comprising a detector.

26. A method of detecting fluorescence, comprising:
a) contacting a sample with a multi-well plate, comprising:
   i) a multi-well plate, comprising:
      a) more than 864 wells and each well comprising a wall and a bottom, said bottom with a low fluorescence and high transmittance portion comprising a cycloolefin polymer, and
      b) a frame, wherein said wells are disposed in said frame,
   wherein said multi-well plate is for detecting a signal from a sample and said multi-well plate has a footprint of a standard 96-well microtiter plate, and
b) and detecting a signal from said sample.

27. The method of claim 26, wherein said detecting comprises detecting epifluorescence from underneath said multi-well plate.

28. The method of claim 26, wherein said detecting comprises passing light through said low fluorescence and high transmittance portion.

29. A multi-well plate detecting fluorescence, comprising:
more than 864 wells and each well comprising a wall and a bottom with a low fluorescence and high transmittance portion comprising a cycloolefin copolymer, and
a frame, wherein said wells are disposed in said frame,
wherein said multi-well plate is for detecting fluorescence from a sample and said multi-well plate has a footprint of a standard 96-well microtiter plate.

30. The multi-well plate of claim 1, wherein said cycloolefin polymer comprises cyclopentane.

31. The multi-well plate of claim 1, wherein said cycloolefin polymer comprises cyclohexane.

32. The multi-well plate of claim 1, wherein said cycloolefin polymer comprises cycloheptane.

* * * * *